United States Patent [19]
Sandahl et al.

[11] Patent Number: 6,098,098
[45] Date of Patent: Aug. 1, 2000

[54] SYSTEM FOR MANAGING THE CONFIGURATION OF MULTIPLE COMPUTER DEVICES

[75] Inventors: Joel E. Sandahl, Southlake; Lyle D. Baker, Ft. Worth, both of Tex.

[73] Assignee: Enhanced Messaging Systems, Inc., Southlake, Tex.

[21] Appl. No.: 08/970,831

[22] Filed: Nov. 14, 1997

Related U.S. Application Data

[60] Provisional application No. 60/031,353, Nov. 15, 1996.

[51] Int. Cl.$^7$ .................................................. G06F 15/177
[52] U.S. Cl. .......................................................... 709/221
[58] Field of Search ................................... 709/220, 221, 709/222

[56] References Cited

U.S. PATENT DOCUMENTS

| | | | |
|---|---|---|---|
| 5,664,170 | 9/1997 | Taylor | 709/220 |
| 5,838,907 | 11/1998 | Hansen | 709/220 |
| 5,838,918 | 11/1998 | Prager et al. | 709/221 |
| 6,038,586 | 3/2000 | Frye | 709/100 |

*Primary Examiner*—Kenneth R. Coulter
*Attorney, Agent, or Firm*—Kenneth J. LuKacher

[57] ABSTRACT

A system for managing the configuration of multiple computer devices over a network is provided in which each of the computer devices has memory for storing local configuration information and is configurable in accordance with its stored local configuration information. A file server in the system is connectable to each of the computer devices via the network. The file server has memory storing master configuration information for each of the computer devices. Each of the computer devices periodically connects via the network to the file server to provide a connected computer device. The connected computer device compares data characterizing its master configuration information at the file server with data characterizing its local configuration information to determine if its master and local configuration information are different. When one or more components of the master configuration information are determined different, such components are transferred from the file server to the connected computer device. The connected computer device revises its configuration in accordance with the transferred master configuration information. The computer devices may be part of a network system where such computer devices inter-operate with each other. This network system is properly configured for inter-operation when the local configuration information at each of the computer devices corresponds to their respective master configuration information at the file server. Local configuration information may be changed at the computer device, such changes are sent to the file server for review to determine whether to revise the master configuration in accordance with such changes.

63 Claims, 7 Drawing Sheets

SYSTEM FOR MANAGING THE CONFIGURATION OF MULTIPLE COMPUTER DEVICES

DESCRIPTION

This application claims the benefit of priority from co-pending U.S. Provisional Application Ser. No. 60/031,353, filed Nov. 15, 1996.

FIELD OF THE INVENTION

The present invention relates to a system (method and apparatus) for managing the configuration of multiple computers, and relates particularly to a system for managing the configuration of multiple computers connectable via a network to a network file server which contains configuration information for each computer. This invention is useful for centrally managing the configuration of a network or system of computers (called a network system herein) which may be remote from each other and which are connected to each other via a network. The computers may be implemented as highly configurable computer devices defined below.

BACKGROUND OF THE INVENTION

Managing the configuration of multiple computer devices of a network system is important in assuring that inter-operation of such devices provides desired network system operation. Typically, each computer device is a separate microprocessor based computer system which is configured in terms of the computer programs, files and parameters settings which control its function. One reason these computer devices are highly configurable is that computer programs and files may be inputted via electrical alterable read-only memories or disk drives, such as by adding new versions of computer programs. One problem in a network system having multiple computer devices is difficulty in maintaining the configuration of each computer device such that their inter-operation provides desired network system operation. This is a major problem in network systems having multiple computer devices which are separated by vast geographic areas, such as in paging and other wireless messaging systems.

Conventionally, each computer device of the network system is locally configured by executing computer configuration files when the device is started-up (or booted), such as autoexec.bat and config.sys files used by computer devices operating on a MS-DOS operating system. In response to executing such configuration files, operating parameters are set and files are loaded into local memory of the computer device, such as RAM, from its hard drive, or from a network file server when the device is on a Local Area Network (LAN). The configuration files may also specify which loaded files represent programs which should be running (i.e., executed) on the computer device. Often when the computer devices are connected over a network to a network file server, each computer device on start-up downloads from a network file server a computer program file which contains or references configuration information for the device. The computer device, responsive to this downloaded program file, then sets up its configuration. This process of downloading a file on start-up is commonly known as a BOOTP-TFTP.

Thus, typically each of its computer devices loads, on start-up, computer configuration files and operates in response thereto, but after start up there is no mechanism for assuring that the configuration is proper to provide desired network system operation. Further, during the operation of each of the computer devices of the network system, the system cannot centrally control the configuration of each device, as when to the computer device's configuration is locally altered. For example, if a new computer file version is loaded at the computer device which revises its configuration, the revised configuration will not be detected and corrected until the computer device's operation is adversely effected. Also, during operation of the computer device, the network system cannot centrally control and revise the configuration of each computer device when the configuration of the device needs to be revised.

In addition, when computer files are specified by configuration files to be downloaded from a network file server, all computer files are downloaded regardless of whether those files are present at the computer device, such as on its hard drive. Often such files are already present at the computer device, and downloading them wastes both network bandwidth and time. Thus, it is desirable to control over a network the configuration of each computer device of the network system to assure that the configuration of each device provides desired network system operation while minimizing network bandwidth usage.

SUMMARY OF THE INVENTION

Accordingly, it is the principal object of the present invention to provide an improved system (method and apparatus) for managing the configuration of multiple computer devices which operate as part of a network system. The term computer device as used herein is generic to all computer systems or equipment which are software configurable.

Another object of the present invention is to provide an improved system for managing the configuration of multiple computer devices over a network in which a network file server is provided for storing master configuration information for each computer device.

A further object of the present invention is to provide an improved system for managing the configuration of multiple computer devices over a network in which each of the computer devices compare data characterizing its master configuration information stored on a network file server with data characterizing its local configuration information to determine if the master and local configuration information differ, rather than comparing the contents of the master and local configuration information.

A still further object of the present invention is to provide an improved system for managing the configuration of multiple computer devices which allows changes in the local configuration of each of the computer devices subject to review of a system operator who assures that such configuration changes do not adversely effect the inter-operation of the computer devices with each other.

Briefly described, the present invention provides a system for managing the configuration of multiple computer devices via a network. Each of the computer devices has memory for storing local configuration information and is configurable in accordance with its stored local configuration information. A file server is provided which is connectable via the network to each of the computer devices. The file server has memory storing master configuration information for each of the computer devices. Each of the computer devices periodically connects via the network to the file server to provide a connected computer device. The connected computer device compares data characterizing its master configuration information at the file server with data characterizing its local configuration information to determine if its master and local configuration information are different. When the master and local configuration information are determined different, at least one component of the master configuration information different from the local configuration information of the connected computer device is transferred from the file server to the connected computer device. The connected computer device then revises its configuration when the master configuration information has been transferred to said connected computer device in accordance with the transferred master configuration information.

The computer devices may be part of a network system in which one or more of the computer device inter-operate with each other. This network system is properly configured for such inter-operation when the local configuration information at each of the computer devices corresponds to their respective master configuration information at the file server. To change the configuration of the computer devices, changes may be made to their master configuration information at the file server, such changes will automatically revise the local configuration information for the computer device when the computer device connects to the file server as described above.

The file server operates responsive to requests sent from the connected computer device, such as for providing data characterizing the master configuration information for the connected computer device stored on the file server, and for sending one or more components of the master configuration information from the file server to the connected computer device. Further, local configuration information may be changed at the computer device, however such changes are sent to the file server for review by an operator to determine whether the master configuration information for the computer device should be revised in accordance with such changed local configuration information.

The master configuration information may include instructions setting operational parameters of the computer devices and loading of application files on the computer devices. Copies of such application files are stored on the file server. Application files referenced by the master configuration information which differ from application files stored at the connected computer device may also be transferred from the file server to the connected computer device.

BRIEF DESCRIPTION OF THE DRAWINGS

The foregoing objects, features and advantages of the invention will become more apparent from a reading of the following description in connection with the accompanying drawings, in which.

DESCRIPTION OF THE INVENTION

Figure 1:
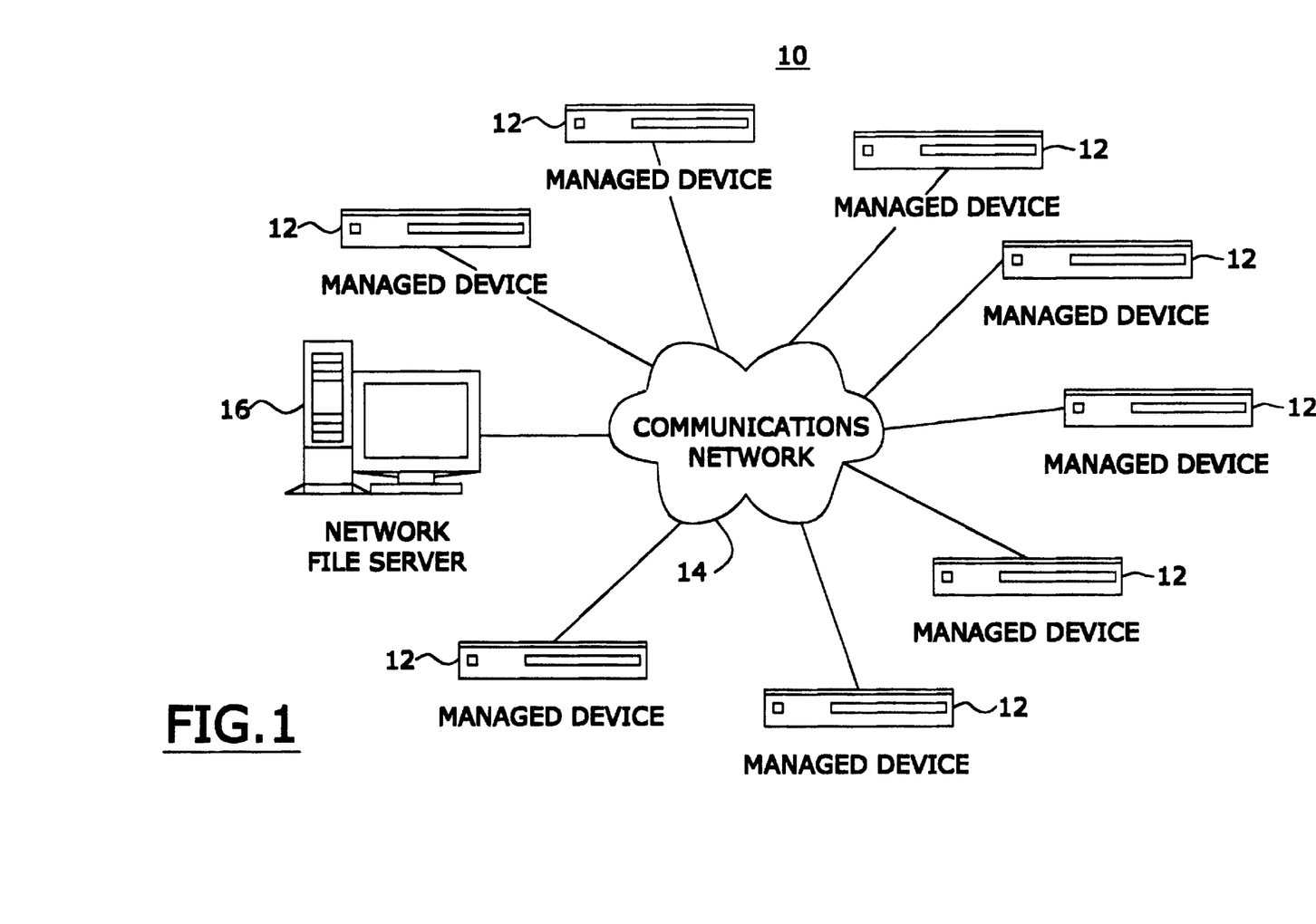
FIG. 1 is a block diagram of the system of the present invention.

Referring to FIG. 1, a system 10 is shown having multiple computer devices 12, (referred hereinafter as managed devices 12) connected via a communication network 14, such as a Public Switched Telephone Network (PSTN), leased line to a Wide Area Network (WAN), or a Local Area Network (LAN). The managed devices each represent a microprocessor based computer system or equipment, such as a PC, which is configurable by the computer files stored and/or executed from its memory, such as RAM or disk drives. A modem may be used by a managed device 12 to establish connections over the network. Preferably, network 14 is internet based. Each of the computer devices 12 in system 10 may be part of an overall network system, such as a paging messaging system, in which the inter-operation of the devices with each other provides desired overall network system operation. The inter-operation of the devices may be over the same network 14 as system 10, or may be on a different network.

Each managed device 12 connects to a network file server 16 over network 14 to access (or request) computer files (i.e., read and/or write files) and read (or request) characteristics about such files. Such characteristics are referred to herein as computer file related information since the characteristics represent computer readable descriptive information or data about such computer files, for example, associated file names, file creation date, last file modification data, file size, file type, file check codes, and file versions. Computer files represent a collection of computer readable and/or executable data. The file server 16 stores master configuration information for each of the managed devices 12. Master configuration information for each of the managed devices 12 is defined as a master configuration file containing instructions for setting operational parameters of the managed device (e.g., drivers, buffers, ports set up, and other similar parameters effecting device operation), and loading computer files for the device. Copies of such computer files are stored on the file server 16 for the managed devices.

Figure 2:
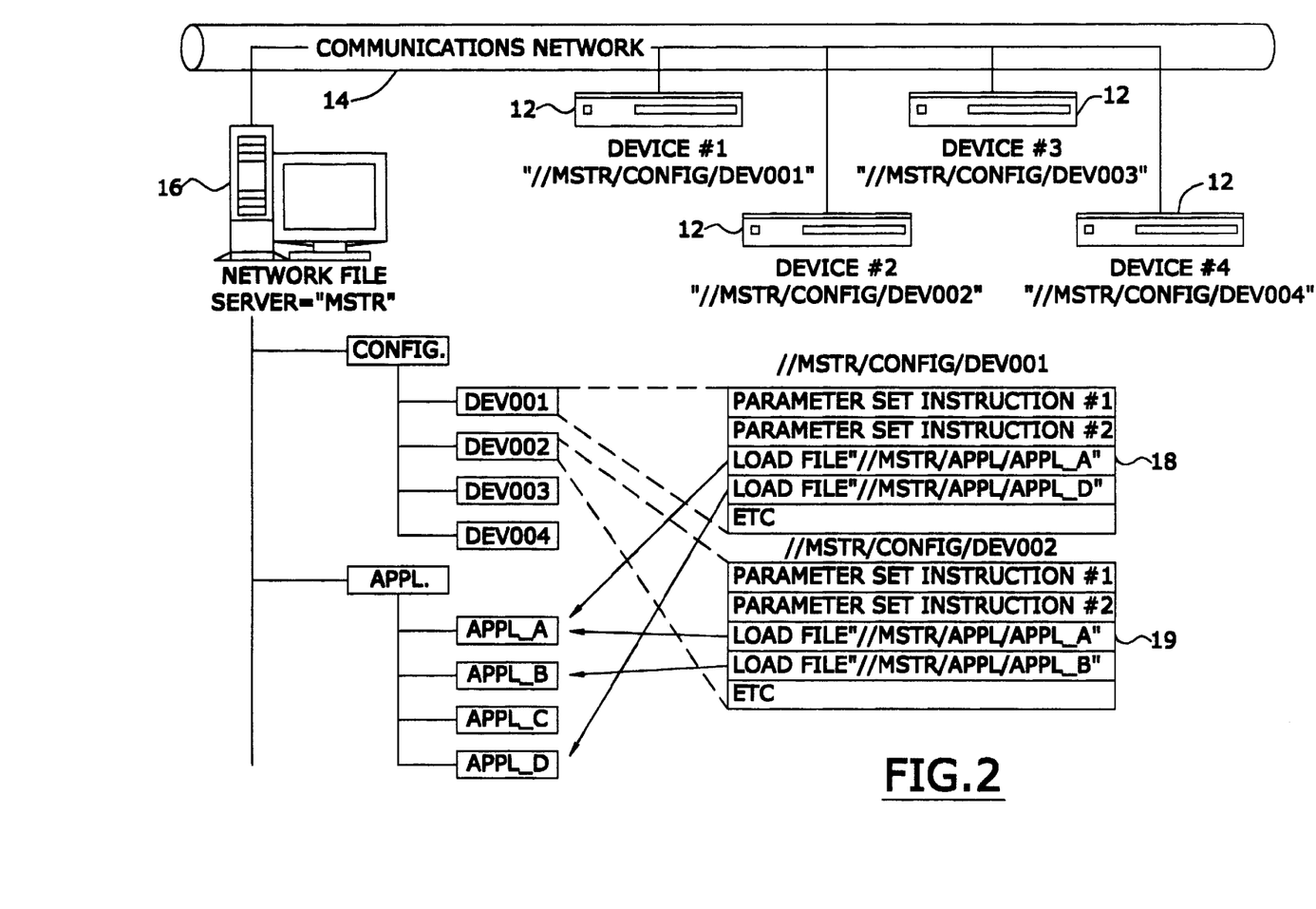
FIG. 2 is a block diagram showing the organization of computer files at a network file server in the system of FIG. 1.

Referring to FIG. 2, the file organization for file server 16 for storing the master configuration file for four managed devices 12, labeled devices #1–4. The file organization has a first level directory called "mstr" and at least two second level directories, config and appl. Each of the managed devices' master configuration file, such as dev001 for device #1, and dev002 for device #2, is stored in the config directory. The master configuration file may be unique for a managed device 12, or may be shared by several managed devices 12. Each master configuration file contains only the essential configuration instructions for configuring a managed device 12, i.e., those instructions needed for configuring the managed device to assure that in the overall network system its inter-operation with other managed devices 12 is appropriate. Examples of master configuration files at 18 and 19 are shown for device #1 and device #2, respectively. The load file instructions in these examples define the computer files appl_a through appl_d shown in the appl directory (as indicated by arrows in the figure), which should be loaded in memory of device #1 and #2, respectively. The present invention is not limited to the file organization or structure shown in FIG. 2, other types of file organizations and file names are within the scope of the present invention for storing the master configuration information, and other computer files specified therein.

Figure 3:
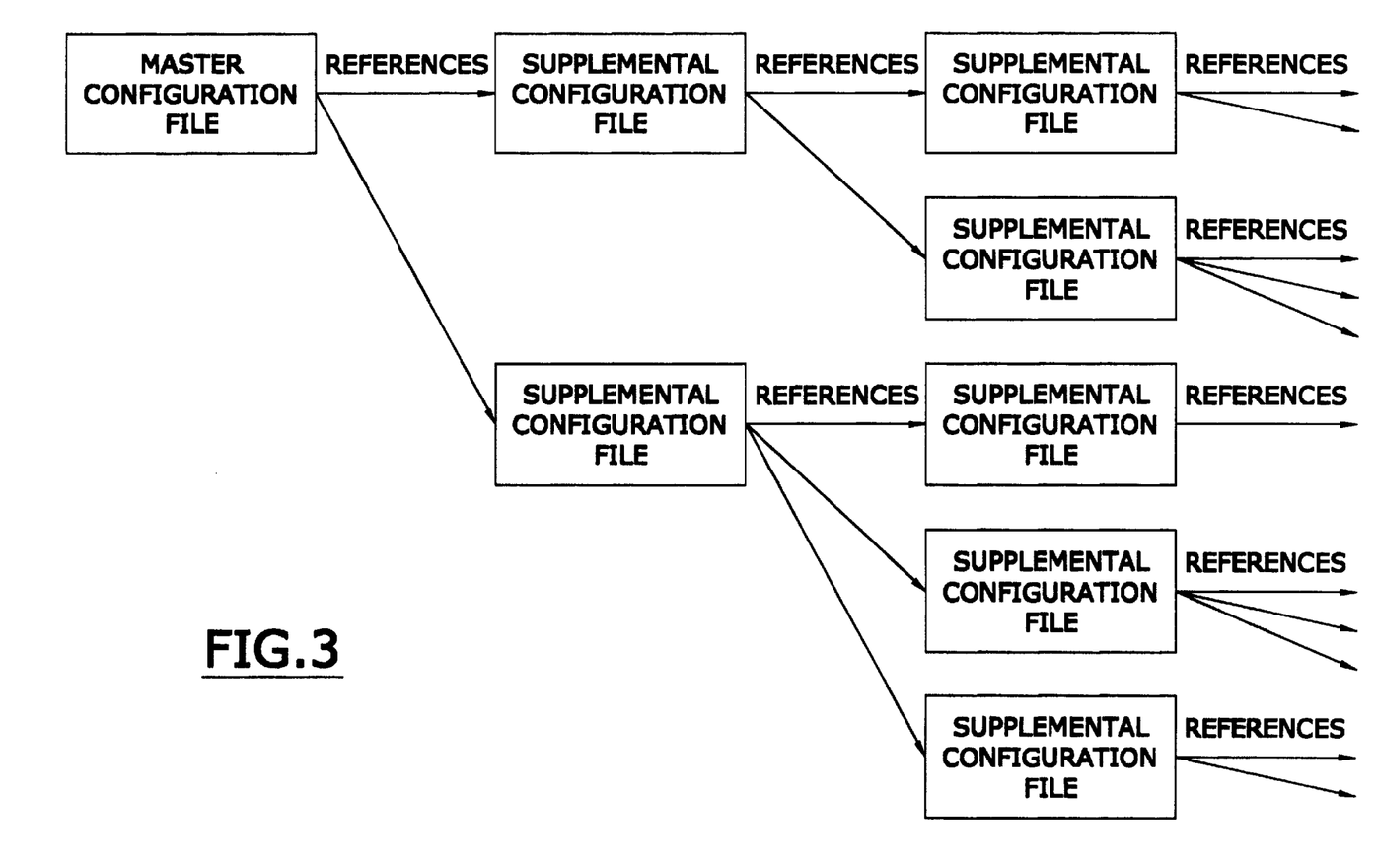
FIG. 3 is a block diagram showing the referencing of supplemental configuration files from the master configuration file stored in the network file server of FIGS. 1 and 2.

Referring to FIG. 3, the master configuration file may also have one or more instructions referencing supplemental configuration files, which may also contain configuration information, such as parameter setting or load file instructions. In turn, a supplemental configuration file can have instructions referencing other supplemental configuration files, and so on, thus forming a tree structure of configuration files starting from the master configuration file. The term master configuration information for each managed device 12 encompasses the master configuration file and any associated supplemental configuration files. Hence, the master configuration information can be considered to have components of information defined by such files. Managed devices 12 which have in part common configuration instructions may reference to the same supplemental configuration file(s).

Each of the managed devices 12 has memory, such as RAM or disk drive(s), which stores local configuration information, which is identical with its master configuration information at the file server 16 if the configuration of the managed device is proper. The local configuration information for each managed device 12 defines a local configuration file, which should be identical to its master configuration file, and local supplemental configuration files, which should be identical with such supplemental configuration files associated with its master configuration file. Also, memory of each of the managed devices 12 also records the related file information for each computer file transferred from the file server 16, including its master configuration file, supplemental configuration files, and all other computer files from the file server 16 used in configuring the managed device 12. Note that when each managed device 12 is started-up (or booted) it acts responsive to instructions contained in its local configuration file and associated local supplemental configuration files, e.g., setting parameters and loading files stored on its disk drive into RAM of the managed device.

Figure 4:
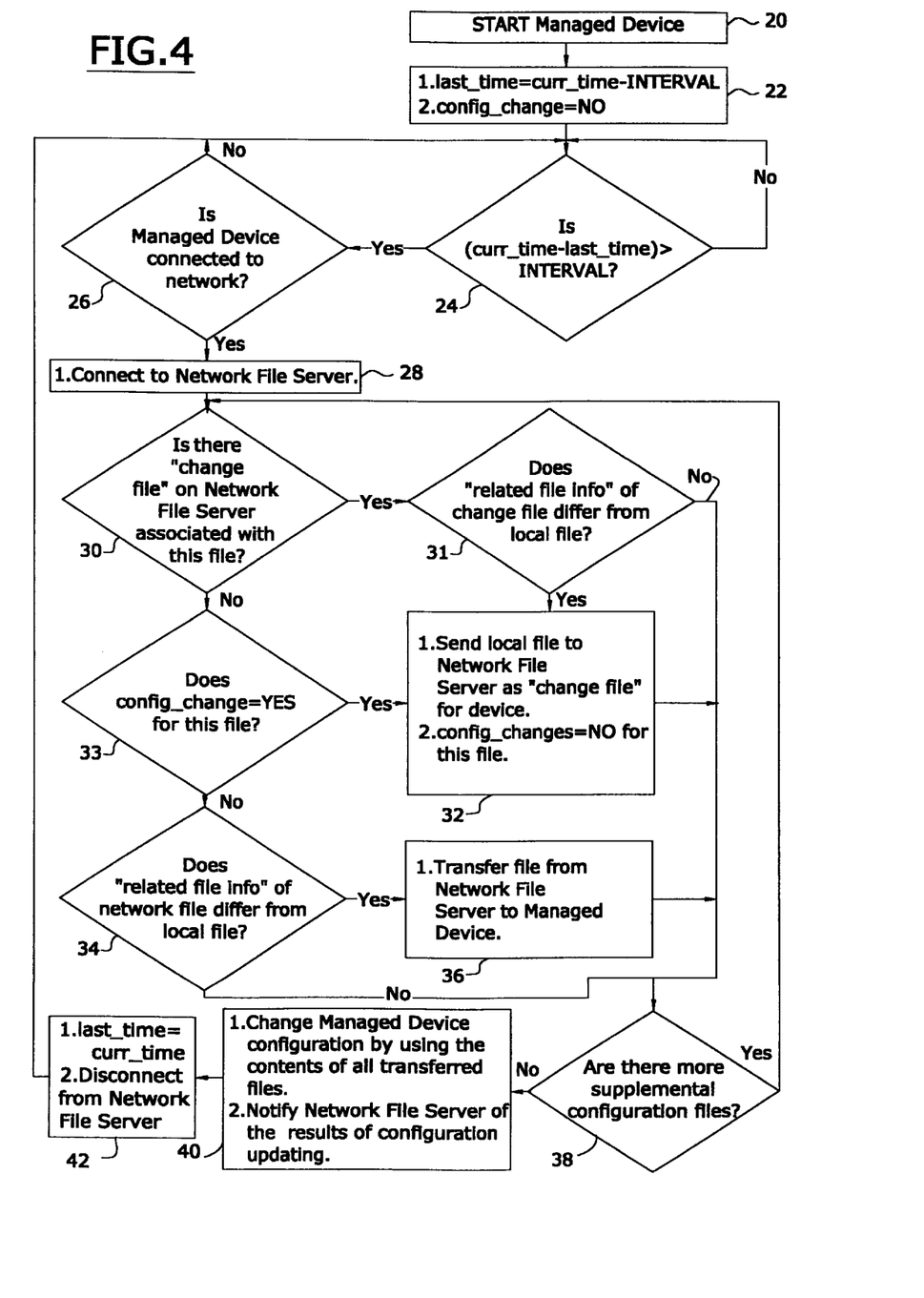
FIG. 4 is a flow chart showing the operation of the managed computer device in the system of FIG. 1.

Referring to FIG. 4, a flow chart is shown for the programmed instructions in memory operating with each of the managed devices 12 of system 10, and will be described in reference to a single managed device 12. After start (step 20), the last_time variable is set to the value of the curr_time variable minus a pre-defined INTERVAL (step 22). Curr_time represents the current real time, such as read from a real time clock in the managed device 12, and INTERVAL is a pre-defined time interval which establishes the minimum period between checks by the managed device for configuration changes. Also at step 22, a flag, config_change, is set to no for each of the configuration files locally stored in memory of the managed device. This flag is changed by the managed device 12, such as by setting the flag to yes, for a local configuration file or any associated supplemental configuration file, whenever a user at the device makes any local change(s) is the particular configuration file, such as changing a parameter setting, a file name, or file version in one or more instructions. Thus, the configuration of the device 12 may to be locally revised by a user, however its revision will be subject to review by a system operator at the file server 16, as will be described in detail later below.

Once the difference between the curr_time and the last—time is greater than INTERVAL (at step 24), the managed device 12 checks if it is connected to the network 14 (step 26). If the managed device 12 is not connected to the network 14, it attempts to establish a network connection and the no branch is taken to step 24, otherwise the yes branch is taken to step 28. At step 28, the managed device 12 connects to the network file server 16 by sending to the file server a Connection and Service Request.

After a connection to the file server 16 is established, steps 30–38 are performed for each configuration file of the managed device 12. The term "this file" in FIG. 4 represents the particular configuration file being checked. To illustrate steps 30–38, the following discussion is in reference to the first configuration file checked, the local configuration file.

At step 30, a check is made for the existence of a change file on the file server 16 for the local configuration file. In this case, a change file represents a copy of the local configuration file having locally made configuration change (s) which may have been sent by the managed device 12 to the file server 16. Such a change file may be sent to the file server 16 at step 32 (described below) and its stored file distinguished from the prior version of the configuration file on the file server, such as by switching its file extension to ".chg". Note that both the change file (changed local configuration file) stored on the file server and the master configuration file may have the same file name, but a different file extension. Thus, step 30 may be performed, for example, by checking for a ".chg" extension for the file name of the master configuration file stored at the file server 16. If a change file exists, the managed device 12 at step 31 checks if the related file information about the change file on the file server differs from the related file information recorded in memory of the managed device about the local configuration file. Related file information about the change file is obtained by the managed device 12 via a Related File Information Request to the file server 16. If the related information differs, then the no branch is taken to step 38, otherwise the yes branch is taken to step 32.

At step 32, the local configuration file is sent as a change file on a Change File Request to the file server 16, and config_change is then set to no. After the change file is sent to the file server 16 (or the no branch from step 31 was taken), the managed device 12 replaces the related file information about the local configuration file with the related file information about the change file in memory of the managed device and proceeds to step 38. Note that by replacing the related file information for the local configuration file in memory of the managed device at step 32, if the system operator has not ruled on the change file during subsequent intervals, the no branch will be taken from step 31 to avoid sending a duplicate change file to the file server 16.

Referring back to step 30, if there is no change file present at the managed device 12 for the local configuration file, the managed device then checks if config_change equals yes. If so, then the managed device 12 branches to step 32 where step 32 is performed as described above, otherwise it branches to step 34. At step 34, the related file information about the master configuration file (i.e., the network file) is obtained via a Related File Information Request to the file server 16, and the returned information is compared to related information about the local configuration file recorded in memory of the managed device to determine if the master and local configuration files differ. Thus, the comparison of related filed information is performed without download of the file to the managed device. In the example of FIG. 2, the managed device #1 can send a Related File Information Request in a command "//mstr/config4ist.dev001" to the file server and then compare the returned information from the file server with a listing of similar information about the local configuration file recorded in memory of the managed device. If the related file information between the master and local configuration files differs, then the managed device 12 proceeds to step 36 where a copy of the master configuration file from the file server 16 is transferred to the managed device by the device sending a Send File Request for the master configuration file to the file server, and then storing the received file into the memory of the managed device 12.

Preferably, when an instruction in the master configuration file references to a stored file on the file server 16, the related file information about the master configuration file will include related file information about the stored file, such as the file name, version, creation date, size, or other similar identifying information. When the comparison of the related file information between the master and local configuration files is performed at step 34, this related file information about the stored file is used to determine if a copy of the file exists in memory of the managed device, and if so, that the version of the is proper. If the copy of the file is not present in memory of the managed device 12 or if its version is not proper, the file is transferred from the file server 16 into memory of the managed device thereby replacing an earlier version, if any, at step 36.

Since each supplemental configuration file, if any, also needs to be similarly processed through steps 30–38, the managed device 12 after steps 31, 32 or 36 checks at step 38 whether there are any more supplemental configuration files which have not yet been processed through steps 30–38. In other words, have all the supplemental files referenced in the transferred master configuration file (or in the local configuration file if the master configuration file was not transferred to the device), in any transferred supplemental configuration file (or in the corresponding local supplemental configuration file if no transfer occurred) have been processed through steps 30–38. This processing may be done recursively through all the branches of the tree structure of the master configuration information, or through any other structure storing the master configuration information. If there are no more supplemental configuration files, then the managed device proceeds to step 40, otherwise a subsequent supplemental configuration file is checked, starting at step 30. This subsequent supplemental configuration file is checked in the same manner as the local configuration file described earlier in connection with steps 30–36, for example, if step 34 takes place, the related file information about the supplemental configuration file on the network file server 16 (i.e., the network file) is compared to the related file information about the local supplemental configuration file, if any, recorded in memory of the managed device.

After all supplemental files, if any, have been processed through steps 30–38, the managed device proceeds from step 38 to step 40. At step 40, the configuration of the managed device 12 is changed responsive to the transferred master configuration file and any transferred supplemental configuration files. In changing its configuration, the managed device 12 takes actions, such as executing transferred software files, and setting operational parameters. Optionally, before changing its configuration, the managed device 12 may compare the transferred configuration file(s) with the previous configuration file(s) in memory of the managed device to determine the proper course of action, such as rebooting the software files for the managed device, or instead, changing operational parameters and executing transferred software files within its present configuration. Further at step 40, after the managed device 12 has revised its configuration, it notifies the file server 16 of the results of the configuration update by sending to the file server a Managed Device Update Status message containing the results of the configuration update, such as whether it was successfully completed.

The transferred master configuration file then replaces the local configuration file, and any transferred supplemental configuration file becomes (or replaces an existing) local supplemental file. Next, at step 42, last_time is set to the curr_time, and the managed device 12 disconnects from the file server 16 such that the connection with the file server is only temporarily established. After step 42, the managed device 12 branches back to step 24 to repeat the above after the next time interval specified by INTERVAL has occurred.

Figure 5:
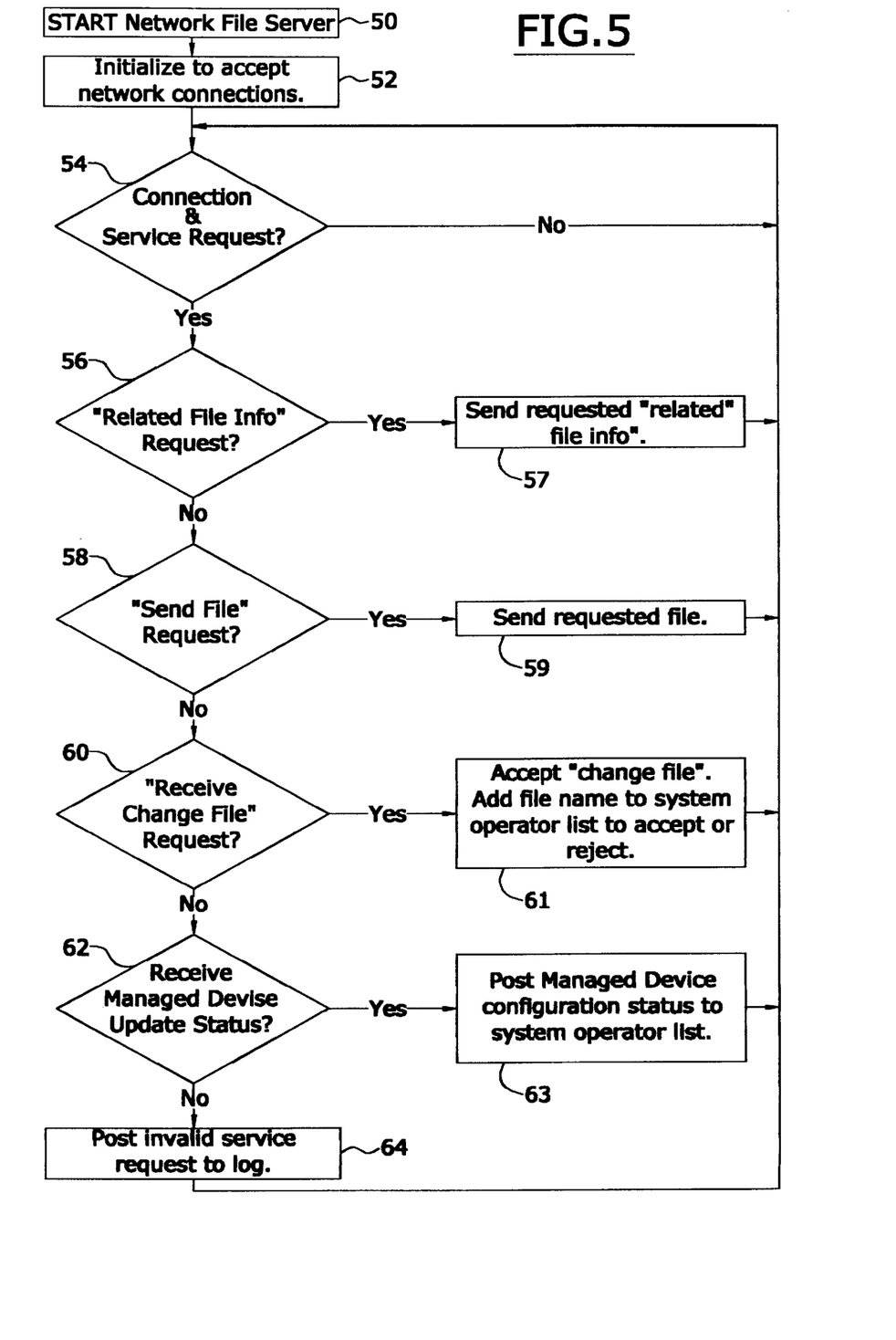
FIG. 5 is a flow chart showing the operation of the network file server in the system of FIG. 1.

Referring to FIG. 5, a flow chart of the responsive operation of the network file server 16 to the Requests of the managed devices described in connection with FIG. 4. After start (step 50), the file server is initialized to accept network connection (step 52). The file server then waits for a Connection and Service Request from a managed device 12 (step 54), hereinafter called the connected managed device. Upon receiving a Request, it acts in response to one of three types of requests from the connected managed device: First, a Related File Information Request concerning a file stored on the file server. If such a request is received, the file server sends the requested related file information to the connected managed device (step 57). Second, a Send File Request for a copy of a particular file(s) stored on the file server. If such a request is received, the file server sends the requested file to the connected managed device, such as an FTP transfer. Third, a Received Change File Request with a copy of a change file from the connected managed device. The file server 16 in response to this request accepts the change file and adds the change file's name to a system operator list for acceptance or rejection of the change file as a new configuration file for the connected managed device (step 61). In accepting the change file, the change file is stored on the file server 16 and distinguished from the current version of the configuration file stored at the file server 16, such as by its switching its file extension to ".chg". When a Managed Device Update Status message is received from the connected managed device (step 62), the configuration status contained in the message is stored in another system operator list (step 63). If any of the Requests at steps 56, 58 and 60 were invalid, they are recorded and posted in a log at the file server 16 at step 64. After step 64, the file server 16 disconnects from the connected managed device, and branches to step 54 to wait for the next Connection and Service Request.

Figure 6:
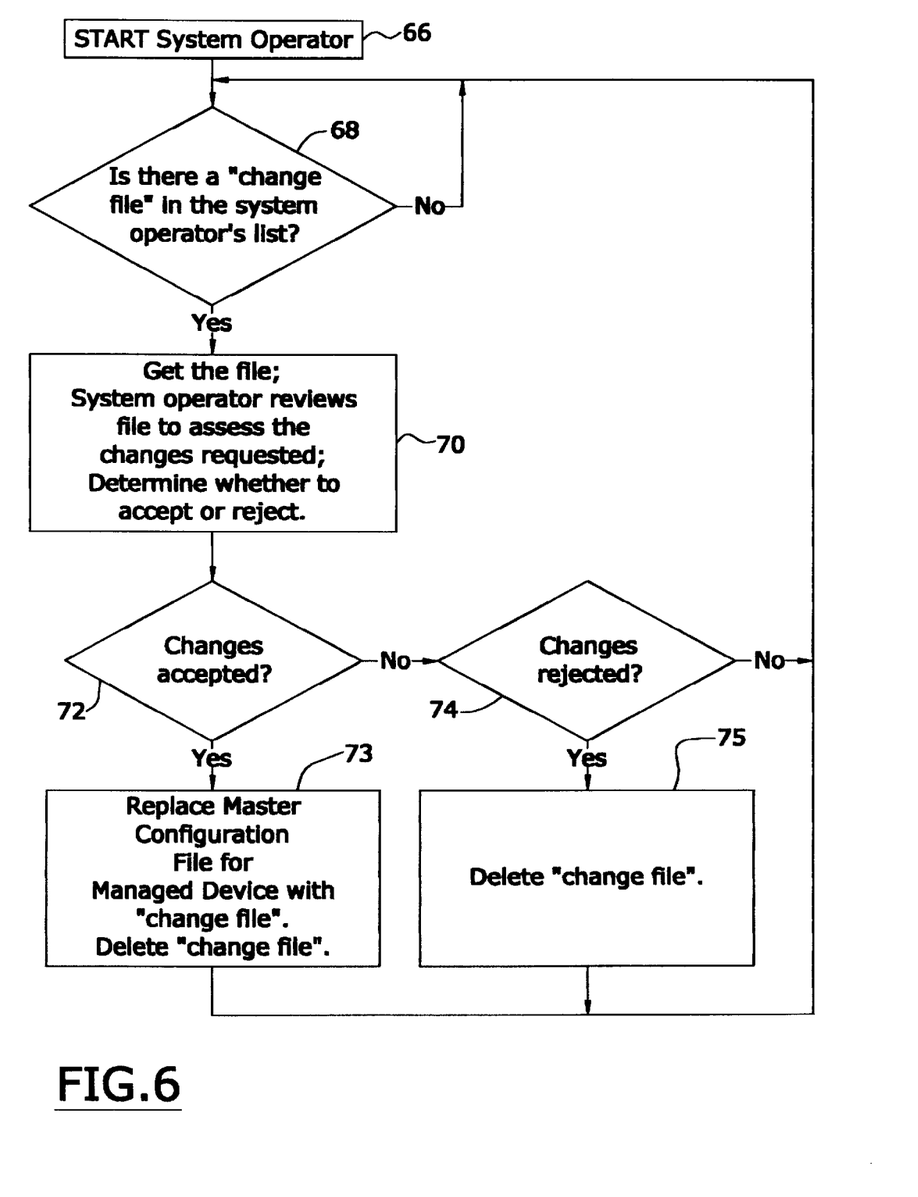
FIG. 6 is a flow chart showing the steps of the system operator in the system of FIG. 1.

Referring to FIG. 6, the process performed by the system operator with respect to any change file sent to file server 16 is shown. After start (step 66), the operator waits for a change file in the system operator's list (step 68). If a change file exists on this list, the system operator gets (accesses) the change file from the file server 16, reviews it to assess the changes, and determines whether to accept or reject the changes in the file (step 70). If the system operator accepts the changes in the file (step 72), it replaces the current version of the configuration file stored at the file server 16 with the change file and deletes the change file from the memory of the file server (step 73). If the system operator rejects the changes in the change file (step 74), the system operator deletes the change file from the file server's memory and retains the current version of the configuration file stored at the file server. As a result of step 74, in FIG. 4 when the managed device which sent the change file checks the file server at step 34, it will find that the related file information about that configuration file from the file server differs from the related file information from the configuration file stored in memory of the managed device, causing it at step 36 to transfer the original version of the configuration file from the server to the managed device, which will replace the changed version at the managed device. After step 73 or step 75 of FIG. 6, the system operator proceeds back to step 68.

Figure 7:
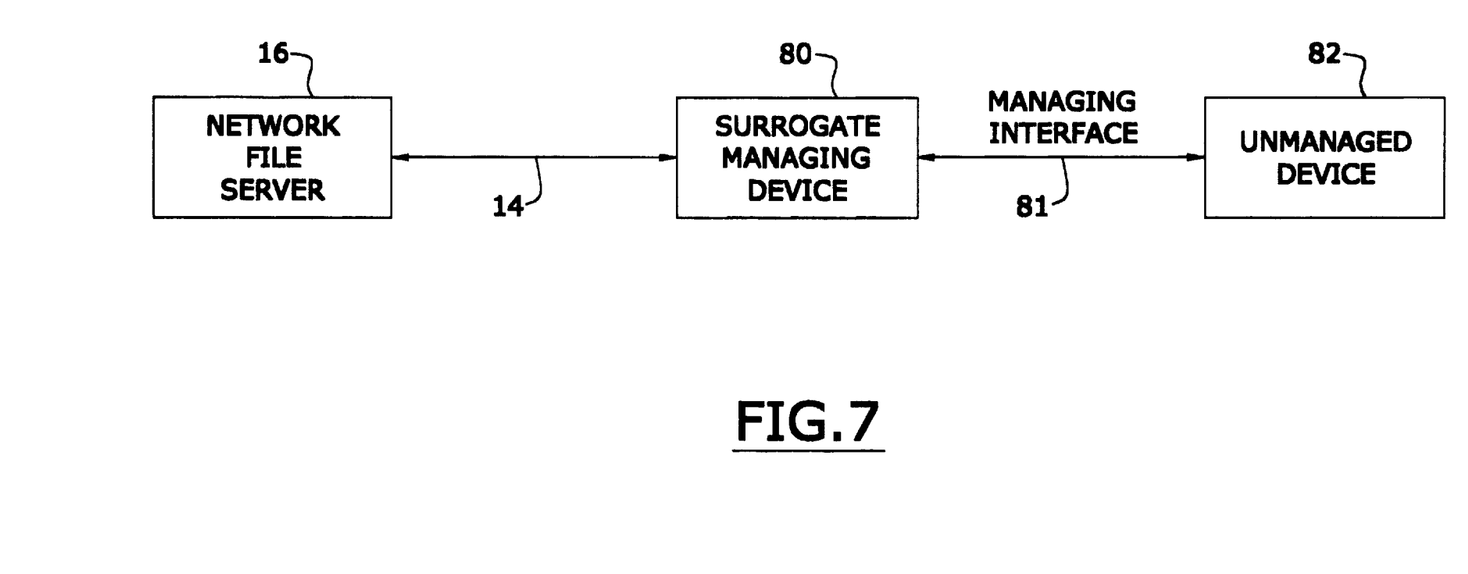
FIG. 7 is a block diagram of an alternative to the managed device in the system of FIG. 1.

Referring to FIG. 7, a managed device 12 may be substituted for a surrogate managing device 80 and an unmanaged device 82, which are coupled by a managing interface 81. Unmanaged device 82 represents a computer system or equipment which cannot directly be controlled in its configuration over the network 14. The surrogate managing device 80 is a computer system which determines the current configuration of the unmanaged device, including software versions and parameter settings, and sets the configuration of the unmanaged device 82 responsive to related file information about its master configuration file or a transferred master configuration file, similar to that as described earlier in managed device 12 (FIG. 4).

In an alternative embodiment, system 10 may not allow local changes in configuration files of a managed device 12 to be made by omitting steps 30 to 33 in FIG. 4, such that step 34 proceeds directly from step 28 and the yes branch from step 38 flows to step 34. Further in this alternative embodiment, steps 60 and 61 of FIG. 5 are omitted, such that step 62 proceeds directly from step 58, and the steps performed in FIG. 6 are not required.

The present invention is useful for managing the configuration of multiple managed devices 12, which may be spread out over a vast geographic area. It has the advantage of storing in a central location, i.e., the file server 16, the configuration for all the managed devices, since each managed device 12 has its own master configuration information (i.e., master configuration file and any supplemental configuration files incorporated by reference) on the file server. All managed devices 12 make their configurations subservient to the its master configuration information. Revisions in the configuration to any managed device 12 can thus be effected by changing its master configuration information. The managed device will discover the new configuration via examination of characteristics about its master configuration information, as described in connection with FIG. 4, and then download the required files and change its configuration responsive to them. Accordingly, a user of system 10 need only manage the master configuration information for the managed devices 12 in the file server 16. This assures that the managed device will have the desired configuration within the time specified by INTERVAL, unless a change file exists at the managed device. If a changed file is associated with the managed device then the check for configuration changes in the master configuration information does not occur until the changed file has been removed from the file server 16 by the system operator. By limiting file transfer and configuration changes to when characteristics defining files, (i.e., related file information) have changed, the network bandwidth required to maintain the managed devices 12 configurations is conserved.

From the foregoing description, it will be apparent that there has been provided improved system (method and apparatus) for managing the configuration of multiple computers, where such computers represent configurable computer devices. Variations and modifications in the herein described system in accordance with the invention will undoubtedly suggest themselves to those skilled in the art. Accordingly, the foregoing description should be taken as illustrative and not in a limiting sense.

What is claimed is:

1. A system for managing the configuration of one or more computers of a network system via a network, said system comprising:

at least one first computer storing first information for configuring said first computer;

a second computer storing second information for configuring said first computer;

means for establishing a connection via said network between said first and second computers;

means for comparing data characterizing said first information with data characterizing said second information which is stored at said second computer to determine if said first and second information is different from each other when said first and second computers are connected without sending said second information to said first computer;

means for sending at least one component of said second information from said second computer to said first computer when said first and second information are determined different from each other by said comparing means; and means for configuring said first computer in accordance with said sent second information.

2. The system according to claim 1 wherein said first and second information represents at least one first configuration file and at least one second configuration file, respectively, and said data characterizing said first and second information represents data including information about said first and second configuration files, respectively.

3. The system according to claim 1 further comprising means for replacing one or more components of said first information with said sent second information such that said first information matches said second information.

4. The system according to claim 1 further comprising:

means for changing said first information stored at said first computer to reconfigure said first computer;

means for sending said changed first information to said second computer; and means for revising said second information stored at said second computer in accordance with said sent changed first information when the change first information does not adversely configure said network system.

5. The system according to claim 1 wherein said establishing means, comparing means, sending means, and configuring means each represents software operating with one of said first and second computers.

6. The system according to claim 1 wherein said establishing a connection means periodically establishes a temporary connection via said network between said first and second computers.

7. The system according to claim 1 further comprising means at said first computer for sending a message to said second computer indicating whether the configuration of said first computer by said configuring mean was successful.

8. The system according to claim 1 wherein said network represents a first communications network, and said system further comprises:

a second communications network; and a page messaging system having a plurality of different ones of said first computer each capable of communication via said second communications network to enable said first computers to inter-operate with said each other within the page messaging system.

9. The system according to claim 8 wherein said first communications network and said second communications network are the same communications network.

10. A method for managing the configuration of one or more computers of a network system via a network comprising the steps of:

providing at least one first computer storing first information for configuring said first computer;

providing a second computer storing second information for configuring said first computer;

establishing a connection via said network between said first and second computers;

comparing data characterizing said first information with data characterizing said second information which is stored at said second computer to determine if said first and second information is different from each other when said first and second computers are connected without said second information being sent to said first computer;

sending at least one component of said second information to said first computer when said first and second information are determined different from each other by said comparing step; and configuring said first computer in accordance with said sent second information.

11. The method according to claim 10 wherein said first and second information represents at least one first configuration file and at least one second configuration file, respectively, and said data characterizing said first and second information represents data including information about said first and second configuration files, respectively.

12. The method according to claim 10 further comprising the step of replacing one or more components of said first information with said sent second information at said first computer such that said first information matches said second information.

13. The method according to claim 10 further comprising the steps of:

changing said first information stored at said first computer to reconfigure said first computer;

sending said changed first information to said second computer; and revising said second information stored at said second computer in accordance with said sent changed first information when the changed first information does not adversely configure said network system.

14. The method according to claim 10 wherein said establishing a connection step periodically establishes a temporary connection via said network between said first and second computers.

15. The method according to claim 10 further comprising the step of sending a message from said first computer to said second computer indicating whether the configuration of said first computer by said configuring step was successful.

16. The method according to claim 10 further comprising the step of providing a page messaging system having a plurality of different ones of said first computer.

17. A system for managing the configuration of a plurality of first computers via a network comprising:

a plurality of first computers, each of said first computer having memory for storing local configuration information in which each of said first computers is configurable in accordance with said stored local configuration information;

a second computer connectable to each of said first computers via said network, said second computer having memory for storing master configuration information for each of said first computers;

means for connecting said first computers to said second computer via said network in which each of said first computers when connected defines a connected first computer;

means for comparing data characterizing said master configuration information for said connected first computer with data characterizing said local configuration information for said connected first computer to determine if the master and local configuration information for said connected first computer are different;

means for transferring at least one component of said master configuration information different from said local configuration information of said connected first computer, when said master and local configuration information are determined different by said comparing means, from said second computer to said connected first computer; and means for revising the configuration of said connected first computer when said master configuration information transferred to said connected computer in accordance with said transferred master configuration information.

18. The system according to claim 17 further comprising means for disconnecting said connected first computer from said second computer device, wherein said connecting means, comparing means, transferring means, revising means, and disconnecting means are periodically enabled for each of said first computer devices.

19. The system according to claim 17 wherein said first computer devices are part of a network system in which one or more first computer device inter-operate with each other, and said local configuration information stored at each of said first computer devices corresponds to said master configuration information for each of the first computer devices, respectively, when said network system is properly configured for said inter-operation.

20. The system according to claim 17 further comprising means for sending from said connected first computer device to said second computer device said local configuration information when said local configuration information has changed from said master configuration information for said connected first computer device, and said second computer device further comprises means for storing said sent local configuration information, means for reviewing said stored local configuration information, and means for revising said master configuration information in accordance with said local configuration information stored at said second computer device when said stored local configuration information will not adversely configure said network system.

21. The system according to claim 17 further comprising means for changing said master configuration information stored at said second computer device to revise said local configuration information for one of said first computer devices when said one first computer device represents said connected first computer device.

22. The system according to claim 17 wherein said first computers represent configurable first computer devices, and said second computer represents a second computer device having means for storing said master configuration information in a data file structure.

23. The system according to claim 22 where said second computer device further comprises:

means, responsive to said connecting means, for establishing a connection with one of said first computer devices;

means, responsive to said comparing means, for providing said data characterizing said master configuration information for said connected first computer device; and means, responsive to said transferring means, for sending said component of said master configuration information from said second computer device to said first computer device.

24. The system according to claim 22 wherein said memory of said each of said first computer devices stores application files, and said master configuration information for each of said first computer device represents instructions for setting operational parameters for the first computer device and loading said stored application files for the first computer device.

25. The system according to claim 22 wherein said master configuration information represents one or more master configuration files, and said local configuration information represents one or more local configuration files.

26. The system according to claim 25 wherein said data characterizing said master and local configuration information represent information about each of said master configuration files and said local configuration files, respectively.

27. The system according to claim 25 wherein said transferred component of said master configuration information represents one of said master configuration files.

28. The system according to claim 25 wherein said master configuration files represent a single master configuration file and one or more supplemental master configuration files referenced by said single master configuration file, said supplemental master configuration files reference other supplemental master configuration files, and said local configuration files correspond to said single master configuration files and supplemental master configuration files for each of said first computer devices when properly configured.

29. The system according to claim 25 wherein said comparing means operates upon each pair of related master and local configuration files.

30. The system according to claim 29 further comprising:
means for changing one of said local configuration files stored at one of said first computer devices;
means for sending said changed local configuration file as a change file for one of said master configuration files from said one first computer device to said second computer device when said one first computer device is connected to said second computer device; and
means for receiving said change file at said second computer device and storing said change file in said memory of said second computer device, wherein when said one first computer device represents said connected first computer device said comparing means is not enabled for the pair of said changed local configuration file and the associated master configuration file.

31. The system according to claim 30 further comprising means for comparing data characterizing said change file stored on said second computer device with data characterizing said changed local configuration file to determine if the change file and changed local configuration file are different when said change file is already stored on said second computer device, and repeating said sending means and storing means if said change file is determined different from said local configuration file.

32. The system according to claim 30 further comprising means for reviewing said change file stored at said second computer device to determine if said change file should replace said related master configuration file or be deleted from said second computer device.

33. The system according to claim 22 wherein:
said second computer device and said first computer devices store application files;
said master configuration information for each of said first computer devices at least defines which of said application files stored at said second computer device should be loaded on the first computer device;
said data characterizing said master configuration information includes at least data characterizing said application files stored at said second computer device which should be loaded on said connected first computer device;
said comparing means further comprises means for comparing said data characterizing said application files with data characterizing said application files stored on said connected first computer device to determine if one or more of said application files stored on said connected first computer device are different from said application files stored on said second computer device and defined by said master configuration information for said connected first computer device;
means for transferring from said second computer device to said connected first computer device any application files which were determined different by said comparing means; and
means for revising the configuration of said connected computer device in accordance with said application files which transferred to said connected first computer device.

34. The system according to claim 22 wherein said revising means further comprises means for replacing said local configuration information stored at said connected first computer device determined different from said master configuration information with said transferred master configuration information.

35. The system according to claim 22 further comprising means for sending a message from said connected first computer device to said second computer device representing the result of said revising means.

36. The system according to claim 22 wherein said second computer device is a network file server, and each of said first computer devices represents a microprocessor based computer system.

37. The system according to claim 22 wherein one or more of said first computer devices represents a third device, which cannot be directly configured responsive to local configuration information, and a fourth computer device interfaced to said third device which is connectable to said second computer device via said network to enable said connecting means, comparing means, transferring means, and revising means to be enabled with respect to said third device.

38. A method for managing the configuration of a system having a plurality of first computers comprising the steps of:
providing a second computer connectable to each of said first computers via a network;
storing master configuration information for each of said first computers at said second computer;
storing local configuration information at each of said first computers in which each of said first computers is configured in accordance with said stored local configuration information at the first computer;
connecting one of said first computers to said second computer over said network;
comparing data characterizing said master configuration information for said connected first computer with data characterizing said local configuration information for said connected first computer to determine if said master and local configuration information for said connected first computer are different;
transferring at least one component of said master configuration information different from said local configuration information of said connected first computer, when said master and local configuration information are determined different by said comparing step, from said second computer to said connected first computer; and revising the configuration of said connected first computer when said master configuration information transferred to said connected computer in accordance with said transferred master configuration information.

39. The method according to claim 38 wherein said first computers represent configurable first computer devices, and said second computer represents a second computer device which stores said master configuration information in a data file structure.

40. The method according to claim 39 further comprising the step of disconnecting said connected first computer device from said second computer device, wherein said connecting step, comparing step, transferring step, revising step, and disconnecting step are carried out periodically for each of said first computer devices.

41. The method according to claim 39 wherein said local configuration information at each of said first computer devices corresponds to said master configuration information for the respective first computer device when said system is properly configured.

42. The method according to claim 39 further comprising the steps of sending from said connected first computer device to said second computer device said local configuration information when said local configuration information has changed from said master configuration information for said connected first computer device, storing said sent local configuration information at said second computer device, reviewing said stored local configuration information, and revising said master configuration information in accordance with said local configuration information stored at said second computer device when said stored local configuration information will not adversely configure said system.

43. The method according to claim 39 further comprising the step of changing said master configuration information stored at said second computer device to revise said local configuration information for one of said first computer devices when said one first computer device represents said connected first computer device.

44. The method according to claim 39 further comprising the step of sending from said second computer device to said connected first computer device data characterizing said master configuration information for said connected first computer device for said comparing step.

45. The method according to claim 39 wherein said first computer devices store application files, said master configuration information for each of said first computer device represents instructions for setting operational parameters for the first computer device and loading said stored application files for the first computer device.

46. The method according to claim 39 wherein:

said second computer device and said first computer devices store application files;

said master configuration information for each of said first computer devices at least defines which of said application files stored at said second computer device should be loaded on the first computer device;

said data characterizing said master configuration information includes at least data characterizing said application files stored at said second computer device which should be loaded on said connected first computer device;

said comparing step further comprises the step of comparing said data characterizing said application files with data characterizing said application files stored on said connected first computer device to determine if one or more of said application files stored on said connected first computer device are different from said application files stored on said second computer device and defined by said master configuration information for said connected first computer device; and transferring from said second computer device to said connected first computer device any application files which were determined different by said comparing step; and revising the configuration of said connected computer device in accordance with said application files which transferred to said connected first computer device.

47. The method according to claim 39 wherein said revising step further comprising the step of replacing said local configuration information stored at said connected first computer device determined different from said master configuration information with said transferred master configuration information.

48. The method according to claim 39 further comprising the step of sending a message from said first computer device to said second computer device representing the result at said connected first computer device after said comparing, transferring and revising steps are carried out.

49. The method according to claim 39 wherein said second computer device is a network file server.

50. The method according to claim 39 wherein one or more of said first computer devices represents a third device, which cannot be directly configured responsive to local configuration information, and a fourth computer device interfaced to said third device which is connectable to said second computer device via said network to enable said connecting, comparing, transferring, and revising steps to be carried out with respect to said third device.

51. The method according to claim 39 wherein said master configuration information represents one or more master configuration files, and said local configuration information represents one or more local configuration files.

52. The method according to claim 51 wherein said data characterizing said master and local configuration information represent information about each of said master configuration files and said local configuration files, respectively.

53. The method according to claim 51 wherein said transferred component of said master configuration information represent one of said master configuration files.

54. The method according to claim 51 wherein said master configuration files represent a single master configuration file and one or more supplemental master configuration files which are referenced by said single master configuration file, said supplemental master configuration files reference other supplemental master configuration files, and said local configuration files correspond to said single master configuration file and supplemental master configuration files when said system is properly configured.

55. The method according to claim 51 wherein said comparing means operates upon each pair of related master and local configuration files.

56. The method according to claim 55 further comprising the steps of:

changing one of said local configuration files stored at one of said first computer devices;

sending said changed local configuration file as a change file for one of said master configuration files from said one first computer device to said second computer device when said one first computer device is connected to said second computer device; and storing said change file on said second computer device, wherein when said one first computer device represents said connected first computer device said comparing step is not carried out for between the pair of said changed local configuration file and the associated master configuration file.

57. The method according to claim 56 further comprising the step of comparing data characterizing said change file stored on said second computer device with data characterizing said changed local configuration file to determine if the change file and changed local configuration file are different when said change file is already stored on said second computer device, and repeating said sending and storing steps if said change file is determined different from said local configuration file.

58. The method according to claim 56 further comprising the step of reviewing said change file stored at said second computer device to determine if said change file should replace said related master configuration file or be deleted from said second computer device.

59. A computer system having stored files which is connectable via a network to a file server having stored files, said system comprising:

means for connecting said system via said network to said file server;

means for comparing data characterizing said files stored on said system with similar files stored on said file server to determine if any of said files are different;

means for requesting files from said file server which were determined different for transmission to said system;

means for receiving and storing said requested files from said file server; and means for configuring said system in accordance with one or more received files.

60. A network file server having stored files representing configuration information for multiple computer systems comprising:

means for establishing a network connection to one of said computer systems;

means, responsive to said one computer system, for sending to said one computer system data characterizing said stored files for said one computer system;

means, responsive to said one computer system, for sending files stored on said server requested by said one computer system;

means, responsive to said one computer system, for receiving at least one file representing a changed version of one of said stored files;

means for storing said received file; and means for revising said stored files in accordance with said received file when said received file does not adversely effect configuration of said one computer system.

61. A configuration management system for one or more computer systems of a network-based system comprising:

a network-based system having a plurality of managed computer systems in which each of said managed computer systems stores first information for configuring the managed computer system;

a server storing second information for configuring each of said managed computer systems, in which at least one component of said first information stored at each of said managed computer systems is associated with a component of said second information stored at said server;

means for sending to each of said managed computer systems from said server at least one component of said second information for configuring the managed computer system when said component of said second information differs from the associated component of said first information at the managed computer system in one or more characteristics or when the associated component of said first information is absent at said managed computer system;

means for updating the configuration of each of said managed computer systems in accordance with said sent second information from said server;

means at each of said managed computer systems for sending a message to said server indicating whether the configuration of said managed computer system by said updating mean was successful; and means for replacing any components of said first information associated with said sent component of said second information to enable said first information at the managed computer system to correspond to said second information at the server associated with the managed computer system.

62. The system according to claim 61 further comprising:

means for changing said first information stored at at least one of said managed computer systems to reconfigure the managed computer system;

means for sending said changed first information from said one of the managed computer systems to said server; and means for revising said second information stored at said server in accordance with said sent changed first information when the changed first information does not adversely configure said network-based system.

63. A system for managing the configuration of one or more computers of a network system via a network, said system comprising:

at least one first computer storing first information for configuring said first computer;

a second computer storing second information for configuring said first computer;

means for periodically establishing a temporary connection via said network between said first and second computers;

means for comparing said first and second information to determine if said first and second information is different from each other when said first and second computers are connected;

means for sending at least one component of said second information from said second computer to said first computer when said first and second information are determined different from each other by said comparing means; and means for configuring said first computer in accordance with said sent second information.

* * * * *